United States Patent Office 2,765,539
Patented Oct. 9, 1956

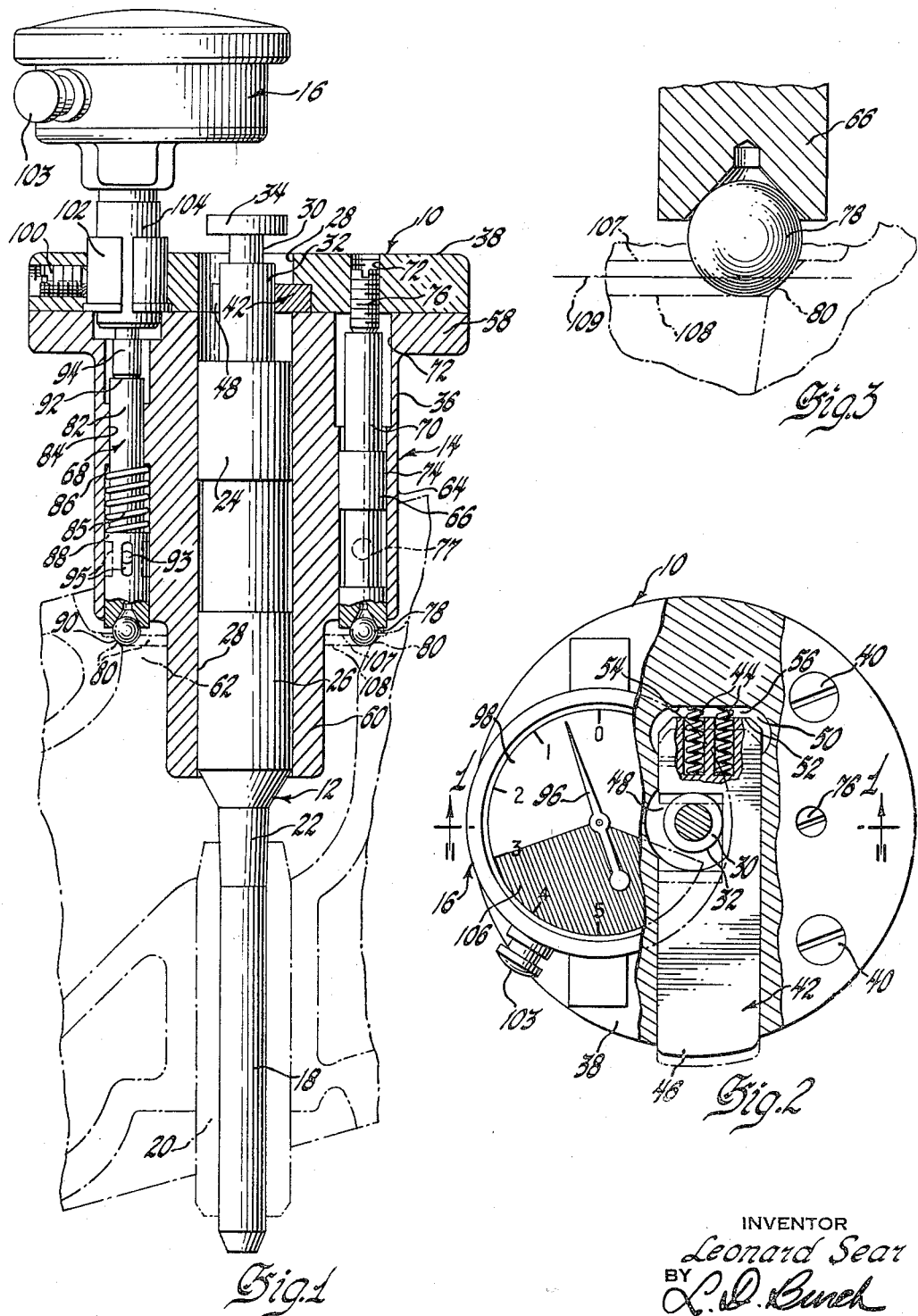

2,765,539

CONCENTRICITY GAUGE

Leonard Sear, Lansing, Mich., assignor to General Motors Corporation, Detroit, Mich., a corporation of Delaware Application December 29, 1954, Serial No. 478,275

6 Claims. (Cl. 33—181)

This invention relates to concentricity gauges, and more particularly to a production gauge particularly adapted for determining the concentricity of valve seats in internal combustion engines and the like.

It is often necessary to determine the extent to which a circular opening is offset with respect to a center about which the opening should be concentric. This is true in the case of the production of internal combustion engines where it is necessary to determine the concentricity of valve seats with respect to the valve guides.

While many such gauges are already known in the art, most of these are specially adapted for use by skilled mechanics in automobile repair shops where various sizes and conditions of valve seats and valve guides are encountered and where time is relatively unimportant.

The proposed concentricity gauge is particularly adapted for measuring eccentricity or runout of valve seats in the case of mass production by unskilled personnel of internal combustion engines and the like. In such cases, it is necessary to quickly determine for each valve seat whether or not the runout is within allowable limits and what the actual runout is if the limits are exceeded. Only one particular size of valve seat or valve stem guide is encountered here, and there is no problem of wear. However, such a gauge should contain a minimum number of parts needing adjustment and should be of rugged construction so that it will stand up under the abuse usually associated with production line conditions.

The proposed gauge incorporates the above features so essential for a production line instrument and not found in present instruments in that it comprises a gauge having a minimum number of inherently strong parts secured together in a manner so that there are no vulnerable outwardly projecting elements which are likely to become broken or get out of adjustment. The proposed gauge is specifically designed for checking only a single size of valve seat. Although the preferred embodiment of the gauge includes a dial indicator as do other gauges now used, the structure of the gauge makes it possible to employ an indicator having a relatively low range with an equal number of units on opposite sides of a zero point.

The gauge body, which may be rotated about a stem, has a dead stop and a spring-loaded follower disposed directly opposite one another; the dead stop and the follower are fixed at equal distances from the axis of the stem, the distance being such that these parts always contact the mean line of a concentric valve seat when the gauge is applied to the valve seat. The dial indicator, which is activated by the spring-loaded follower, thus reads zero while checking a concentric valve seat, and equal units of actual runout on opposite sides of zero when checking an entire valve seat that is not concentric. This is possible because the follower always moves a distance equal to twice the valve seat runout with respect to the dead stop on rotation of the gauge body. The direcion of movement of the follower is parallel to the axis of the stem of the gauge so that on a 45 degree valve seat the total deviation of the follower above and below the mean line of the valve seat is equal to the runout.

Furthermore, because of a special locking mechanism between the gauge body and the stem, the proposed gauge may be easily applied to and removed from a valve seat without danger of injuring the gauge or disturbing any adjustment thereof. The dial of the dial indicator may be appropriately marked so that movement of the hand of the dial into the area representing runout exceeding allowable limits immediately indicates to the inspector using the gauge that the valve seat is not acceptable.

In the drawings:

Figure 1 is a partial cross-sectional view of a gauge embodying the invention taken on the plane of line 1—1 of Figure 2 and looking in the direction of the arrows. The valve structure to be checked for concentricity is shown by the broken lines.

Figure 2 is a top plan view of the gauge shown by Figure 1, with portions thereof broken away and in cross-section.

Figure 3 is an enlarged fragmentary view of a portion of Figure 1 illustrating the manner in which the gauge engages the valve seat.

Referring to the drawings in greater detail, a concentricity gauge 10 embodying the invention may comprise three main parts, which include a pivot member or stem 12, a gauge body 14 and a dial indicator 16.

The stem 12 includes a pilot portion 18 adapted to be inserted into the valve guide 20 and a portion 22 having sufficient taper so that the stem may be wedged into any valve guide which may be encountered on an internal combustion engine or other production line, taking into consideration production tolerances. The central portion of the stem has bearing portions 24 and 26 adapted to engage the walls of the axial bore 28 in the gauge body 14 so that the gauge body may be rotated about the stem 12. The upper portion of the stem includes an annular groove 30, the side walls of which are provided by a bearing portion 32 and a head portion 34.

The gauge body 14 may include a lower portion 36 and the cover 38, with the cover being secured to the lower portion 36 in any suitable manner, as by means of the screws 40. The axial bore 28 extends through the lower portion 36 and the cover 38 of the gauge body so that the gauge body 14 may also be moved along the stem 12. This axial movement of the gauge body may be prevented, when so desired, by forcing the stem 12 downwardly through the gauge body until the latch 42 enters the groove 30 under the tension of springs 44. It will be noted that the latch 42 extends beyond the peripheral surface of the cover 38 so that when the end 46 is pushed radially inwardly against the tension of the springs 44 the latch is removed from the groove 30 and the stem 12 may again be moved relative to the gauge body 14. Movement of the latch 42 is permitted due to the slot 48 in the latch and the clearance 50 between the inner end 52 of the latch and the walls 54 of the chamber 56 in the cover 38 of the gauge body.

The lower portion 36 of the gauge body may be constructed to include three sections of varying diameter. At the top of the lower portion there may be a section 58 having a diameter equal to the diameter cover 38, and the peripheral surfaces of the top section 58 and the cover 38 may be knurled to provide better means by which to grip these parts in rotating the gauge body 14 about the stem 12. At the bottom of the lower portion 36 is a section 60 of reduced diameter adapted to extend through the valve opening 62. The central section 64 of the low portion 36 of the gauge body may have sufficient diameter to accommodate means for activating the dial indicator 16 provided in the gauge.

The means for activating the dial indicator 16 comprises a dead stop member 66 and a spring biased follower 68. The dead stop member 66 comprises a pin 70 passing through a passage 72 in the top and central sections 58 and 64 of the lower portion 36 of the gauge body and having a bearing section 74 to engage the walls of the passage 72. This dead stop member may be adjustable along the length of the passage 72 by means of the set screw 76 and secured in any given position by set screw 77 and it has provided at the bottom end thereof a carbide or other hard-surfaced ball 78 for engaging the valve seat 80. The follower 68 is disposed 180° away from the dead stop 66 and comprises a pin 82 adapted to move axially of the passage 84 and being urged downwardly by any means such as the helical spring 85 located endwise between the shoulders 86 and 88. The follower 68 also has a carbide or other ball 90 at the lower end thereof for engaging the valve seat 80 while the upper end 92 of the follower engages the movable stem 94 of the dial indicator 16. A set screw having a projection 93 adapted to be received by one of the slots 95 may be employed to prevent the follower from rotating.

The dial indicator 16 may be of a commercially available type having the movable stem 94 which actuates a hand 96 and causes it to traverse the dial 98. The dial indicator may be secured to the cover 38 of the gauge body by means of the set screw 100 which bears on the collapsible collar 102 so that it will clamp the lower portion 104 of the dial indicator surrounding the movable stem 94. It should be noted, however, that the range of the dial indicator 16 is relatively low, as compared to some gauges. It will also be noted that an equal number of units of runout are provided on both sides of the zero point and that the value of the runout on either side of the zero point exceeding the maximum allowable value may be clearly marked on the face of the dial, as by a colored area 106. Thus, the gauge described above is designed so that any unskilled workman may quickly and accurately determine the extent of the runout between the valve seat and the valve guide and whether or not the runout exceeds manufacturing tolerances. Any other suitable means of indicating the runout measured by the gauge may of course be employed. The screw 103 may be loosened to free the dial 98 so that the zero point may be set to the middle of the total swing of the hand 96.

In describing the operation of the gauge, it may be assumed that the stem 12 is disposed relative to the gauge body 14 so that the latch 42 is engaged in the groove 30 in the stem. This is the normal condition of the gauge after a seat has been checked and the gauge has been removed from the valve opening. If the latch 42 is not engaged in the groove 30, then it is desirable to engage the latch 42 in the groove 30 as already described above, before applying the gauge 10 to the valve. With the latch engaged in the groove, the gauge 10 may be inserted into the valve opening 62 so that the pilot portion 18 of the stem passes through the valve guide 20 and so that the stem is wedged into the valve guide by means of the tapered portion 22. Since the latch 42 is engaged in the groove 30, the gauge body 14 cannot move downwardly on the stem 12 and sufficient force may be applied to the body 14 to wedge the stem 12 into the valve guide. It will be apparent at this point that the variation in diameter of the different valve guides will be very slight so that a single stem having a sufficient taper will fit any valve guide encountered. This eliminates the need of providing stems of different sizes and means on the gauge body for easily changing the same.

After the stem 12 has been edged into the valve guide 20, the projecting end 46 of the latch may be pushed inwardly so that the gauge body may be lower along the stem until the carbide balls 78 and 90 on the dead stop 66 and the follower 68 engage the valve seat 80. In a concentric valve seat, the points of engagement would be on the mean line 109 mid-way between the edges 107 and 108 of the valve seat. Although this is not true in the case of an eccentric valve seat, a gauge designed in this manner has less chance of running off the edges of an eccentric seat than do present gauges. It is again pointed out that the dead stop 66 is adjustable axially. Thus, prior to use of the gauge 10, the dead stop 66 may be adjusted vertically with respect to the spring biased follower 68 and the dial 98 may be adjusted with respect to the swing of the hand 96 so that when the gauge is rotated on a perfectly concentric valve seat the hand 96 of the dial indicator 16 will remain at zero throughout 360° of rotation.

Having thus preset the dead stop 66 and lowered the gauge body 14 so that the dead stop 66 engages the valve seat, the gauge body 14 is rotated on the stem 12. Assuming an eccentric valve seat, the gauge body will ride freely up and down the stem. This is true because the dead stop 66 is fixed rigidly to the gauge body 14 on a fixed radius from the axis of the stem 12, the radius being the distance at which the dead stop ball 78 will engage the mean line 109 of a concentric valve seat. The weight of the gauge body 14 will maintain the ball 78 in contact with the seat at all times, but this contact will be either at, above or below the median line 109, depending upon the extent of the valve seat runout. While the gauge body 14 is moving down with respect to the stem 12, the valve seat 80 is pushing the spring-loaded follower 68 on the opposite side up at the same rate. While the gauge body is rising, the follower 68 is lowered at the same rate. Thus, the relative motion between the dead stop 66 and the follower 68 during rotation of the gauge body is always twice the movement of one of these members, which magnifies the indicator movement by two. Since the valve seat face is disposed 45° to the direction of movement of the gauge body and follower, the valve seat face is the hypotenuse of an equilateral right triangle in which the legs are one-half the runout and the distance traveled by the follower on one side of the median line 109. Thus, the proposed gauge, pre-set and having a dial indicator as described above, will read actual runout on each side of zero, or twice the runout on both sides of zero.

The fact that the gauge is positioned vertically or along the axes of the valve guide and the valve seat by the dead stop contacting the valve seat means that the variation in height from the top of the valve guide to the valve seat is automatically accounted for. Nor does the extent of penetration of the stem into the valve guide have to be accounted for. This also means that an indicator of smaller range may be employed. The smaller range of indicator coupled with a total movement of the indicator needle equal to twice the actual runout of the valve seat obviously increases the ease and accuracy with which the gauge may be read.

As shown by Figure 2 if three units is the maximum allowable runout for the valve seat being measured, the area 106, three on the dial 98 between three units on either side of zero may be colored in red or otherwise marked. Thus, when the gauge 10 is applied and rotated on a valve seat 80 having a runout exceeding three units, the hand 96 will enter the red area twice, once on one side of zero and once on the other side of zero, and the inspector can easily see that the valve seat is defective and determine the actual value of the runout by direct reading on either side of zero. If the condition of runout of the valve seat being checked is within allowable limits, then the hand 96 of the dial indicator 16 will never enter the red colored area 106 and the inspector knows immediately that the valve seat is acceptable and he can at the same time read directly exactly how much the runout is. The dial 98 may be adjusted as pointed out before so that the zero point is exactly at the middle of the swing of the hand 96.

It must be understood however, that the magnification of the runout reading is due to the measuring means of the gauge and not to the particular indicating means employed.

After a valve seat has been checked, the gauge 10 may be removed from the valve guide 20 by pulling upwardly on the body 14 of the gauge. When this is done, the gauge body 14 moves upwardly along the stem 12 until the latch 42 is disposed opposite the annular groove 30, at which time the springs 44 force the latch into the groove. The head portion 34 at the top of the stem then prevents the body portion 14 of the gauge from coming off the stem 12, and the gauge 10 is now ready for repeating the above described use in checking another valve seat.

From the above description and drawings it is apparent that there has been provided a concentricity gauge specially adapted for use on production lines where a single size valve seats and valve guides are encountered, but where the time element is very important and where the gauge is subjected to considerable abuse. The gauge, once assembled, may be considered to be of single piece construction which needs very little adjustment by the user. The gauge is thus easy to handle and can be quickly and accurately read, even by unskilled employes.

What is claimed is:

1. A gauge for determining the runout of a valve seat with respect to the valve guide, comprising a pivot member adapted to be inserted into said valve guide, a gauge body adapted to be rotated about said pivot member and moved axially with respect thereto, and a pair of valve seat-engaging members associated with said gauge body, said pair of members being oppositely disposed with respect to each other, one of said members being rigidly secured to said gauge body and the other of said members being mounted for relative axial movement with respect to said gauge body.

2. A device for determining the eccentricity of a valve seat with respect to the valve guide, comprising a pivot member having a tapered portion adapted to be wedged into said valve guide and a second portion adapted to extend through and beyond the valve opening, a gauge body adapted for rotary and axial motion with respect to said pivot member, said body and said pivot members having cooperating means associated therewith for preventing said axial movement, a pair of valve seat-engaging members associated with said body, one of said members being secured rigidly to said body and the other of said members being adapted for axial movement with respect to said body, and an indicating device associated with said body adapted to be actuated by axial motion between said other seat-engaging member and said body.

3. A device for determining the eccentricity of a valve seat with respect to the valve guide, comprising a pivot member having a tapered portion adapted to be wedged into said valve guide and a second portion adapted to extend through and beyond the valve opening, a gauge body adapted for rotary and axial motion with respect to said pivot member, said body and said pivot members having cooperating means associated therewith for preventing said axial movement, a pair of valve seat-engaging members associated with said body, one of said members being secured rigidly to said body and the other of said members being adapted for axial movement with respect to said body equal to twice the valve seat runout, and an indicating device associated with said body and adapted to be actuated by said axial motion between said other seat-engaging member and said body, said indicating device indicating directly twice the actual value of runout of said valve seat.

4. A device for determining the eccentricity of a valve seat with respect to the valve guide, comprising a pivot member having a tapered portion adapted to be wedged into said valve guide and a second portion adapted to extend through and beyond the valve opening, a gauge body adapted for rotary and axial motion with respect to said pivot member, said body and said pivot member having cooperating means associated therewith for preventing said axial movement, a pair of valve seat-engaging members associated with said body, one of said members being secured rigidly to said body and the other of said members being adapted for movement with respect to said body equal to twice the valve seat runout, and an indicating device associated with said body and adapted to be actuated by said motion between said other seat-engaging member and said body, said indicating device indicating actual values of valve seat runout on opposite sides of a zero point.

5. In a valve seat concentricity gauge of the type having a stem adapted to be wedged into a valve guide and a gauge body adapted to be rotated about the stem and moved axially thereof, means for contacting said valve seat and actuating an indicator associated with said body, said means comprising one adjustable member secured rigidly to said body and adapted to engage said valve seat and another member resiliently biased for relative axial motion with respect to said body and also adapted to engage said valve seat, said axial motion of said latter member with respect to said first member being twice the runout of said valve seat and actuating a runout indicating device associated with said gauge.

6. In a concentricity gauge for determining runout of valve seats with respect to valve guides, the combination of a pivot member having a tapered portion adapted to be wedged into said valve guide and an annular groove at the end thereof opposite said tapered portion a gauge body having an axial bore therein adapted to receive said pivot member, said body portion being adapted to be rotated about and moved axially along said pivot member, means including a spring biased latch receivable in an annular groove associated with said body and said pivot member for preventing said axial movement between said members, and a pair of mechanical valve seat-engaging members disposed on opposite sides of said body, one of said members being secured rigidly to said body and the other of said members having freedom to move axially but not rotationally with respect to said body, said other member being adapted to actuate an indicator device associated with said gauge by means of said axial movement with respect to said body, said axial movement being twice the runout of said valve seat.

References Cited in the file of this patent

UNITED STATES PATENTS

| | | |
|---|---|---|
| 1,295,103 | Boisvert | Feb. 25, 1919 |
| 1,425,088 | Hayes | Aug. 8, 1922 |
| 1,654,319 | Brown | Dec. 27, 1927 |
| 2,474,294 | Weeks | June 28, 1949 |
| 2,557,840 | Preslan | June 19, 1951 |